United States Patent
Kakaiya et al.

(10) Patent No.: US 11,461,099 B2
(45) Date of Patent: Oct. 4, 2022

(54) SYSTEM, APPARATUS AND METHOD FOR FINE-GRAIN ADDRESS SPACE SELECTION IN A PROCESSOR

(71) Applicant: Intel Corporation, Santa Clara, CA (US)

(72) Inventors: Utkarsh Y. Kakaiya, Folsom, CA (US); Rajesh Sankaran, Portland, OR (US); Gilbert Neiger, Portland, OR (US); Philip Lantz, Cornelius, OR (US); Sanjay K. Kumar, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/911,441

(22) Filed: Jun. 25, 2020

(65) Prior Publication Data
US 2021/0406022 A1    Dec. 30, 2021

(51) Int. Cl.
*G06F 9/34* (2018.01)
*G06F 9/30* (2018.01)
*G06F 12/109* (2016.01)

(52) U.S. Cl.
CPC ............ *G06F 9/34* (2013.01); *G06F 9/30098* (2013.01); *G06F 12/109* (2013.01); *G06F 2212/657* (2013.01)

(58) Field of Classification Search
CPC .. G06F 9/3004; G06F 9/45558; G06F 12/109; G06F 12/1009; G06F 2009/45583
See application file for complete search history.

(56) References Cited

U.S. PATENT DOCUMENTS

| | | |
|---|---|---|
| 2018/0278493 A1 | 9/2018 | Guim Bernat et al. |
| 2019/0370050 A1 | 12/2019 | Kumar et al. |
| 2020/0004703 A1 | 1/2020 | Sankaran et al. |
| 2020/0012530 A1 | 1/2020 | Kakaiya |

(Continued)

FOREIGN PATENT DOCUMENTS

| | | | | |
|---|---|---|---|---|
| EP | 3343367 A1 | 7/2018 | | |
| WO | WO-2018125250 A1 | * | 7/2018 | ......... G06F 9/30087 |
| WO | WO-2018152688 A1 | * | 8/2018 | ......... G06F 9/45558 |

OTHER PUBLICATIONS

Intel Corporation, "Intel® Data Streaming Accelerator Preliminary Architecture Specification," Nov. 2019, 125 pages.

(Continued)

*Primary Examiner* — Gary W. Cygiel
(74) *Attorney, Agent, or Firm* — Trop, Pruner & Hu, P.C.

(57) ABSTRACT

In one embodiment, a processor comprises: a first configuration register to store a pointer to a process address space identifier (PASID) table; and an execution circuit coupled to the first configuration register. The execution circuit, in response to a first instruction, is to obtain command data from a first location identified in a source operand of the first instruction, obtain a PASID table handle from the command data, access a first entry of the PASID table using the pointer from the first configuration register and the PASID table handle to obtain a PASID value, insert the PASID value into the command data, and send the command data to a device coupled to the processor. Other embodiments are described and claimed.

20 Claims, 15 Drawing Sheets

(56) References Cited

U.S. PATENT DOCUMENTS

2020/0117624 A1 4/2020 Kumar et al.
2020/0278935 A1 9/2020 Borikar et al.

OTHER PUBLICATIONS

U.S. Appl. No. 16/911,445, filed Jun. 25, 2020 entitled "System, Apparatus and Method for Enabling Fine-Grain Quality of Service or Rate Control for Work Submissions," in the name of Utkarsh Y. Kakaiya, et al.
European Patent Office, Search Report dated May 12, 2021 in European Patent Application No. 20212490.5 (13 pages).
United States Patent Office, Office Action dated Mar. 31, 2021 in U.S. Appl. No. 16/911,445 (31 pages).

* cited by examiner

SYSTEM, APPARATUS AND METHOD FOR FINE-GRAIN ADDRESS SPACE SELECTION IN A PROCESSOR

TECHNICAL FIELD

Embodiments relate to execution of instructions in processors.

BACKGROUND

In computing systems, system software allocates a unique process address space identifier (PASID) for each process, to allow for ready identification. While this may work well when accessing one address space, when a given process or other entity seeks access to different address spaces associated with different PASIDs, there can be inefficiencies. This is so, as certain context switches may occur, and permissions are checked. One such instruction that uses PASIDs is an enqueue command instruction that allows software to write commands to enqueue registers, which are special device registers accessed using memory-mapped I/O (MMIO). Execution of this instruction may suffer from the above considerations.

DETAILED DESCRIPTION

In various embodiments, a processor-based system may enable multiple non-privileged software clients to issue work requests to shared work queues in devices coupled to one or more processors of the system. Such requests may be issued to one or more devices via a common or shared hardware interface. As examples, the software clients may include drivers, applications, containers, or virtual machines (VMs) that may share the same hardware interface. In this model, a process space address identifier (PASID) is used to identify an address space associated when a given work request. For enabling direct ring-3 submission, system software may allocate a unique PASID for each process, which may be stored in a configuration register such as a given model specific register (MSR), e.g., a PASID MSR.

This programming enables a given software client to issue requests, including work requests that may include an enqueue command instruction, details of which are described herein, to write command data to a destination location within the device. To enable the software client to access shared virtual memory (SVM) of multiple address spaces associated with different PASIDs, embodiments provide processor-internal hardware structures, user-level instructions of an instruction set architecture, and techniques to enable more efficient issuance of work requests including register writes to particular device registers as described herein.

When a client is interacting with multiple non-SVM capable devices, it uses a different PASID for each device, signifying an input/output (I/O) virtual address space associated with the device. Furthermore, if the application is interacting with a mixture of SVM and non-SVM capable devices, different PASIDs are used to identify I/O vs. process address space. Embodiments enable such usage. In addition, for situations where there is not a SVM, e.g., a network interface controller (NIC), non-volatile memory express (NVMe) or so forth, or where a cloud services provider does not enable SVM, embodiments enable use of enqueue command instructions described herein by non-privileged clients using sub-process address spaces.

Figure 1:
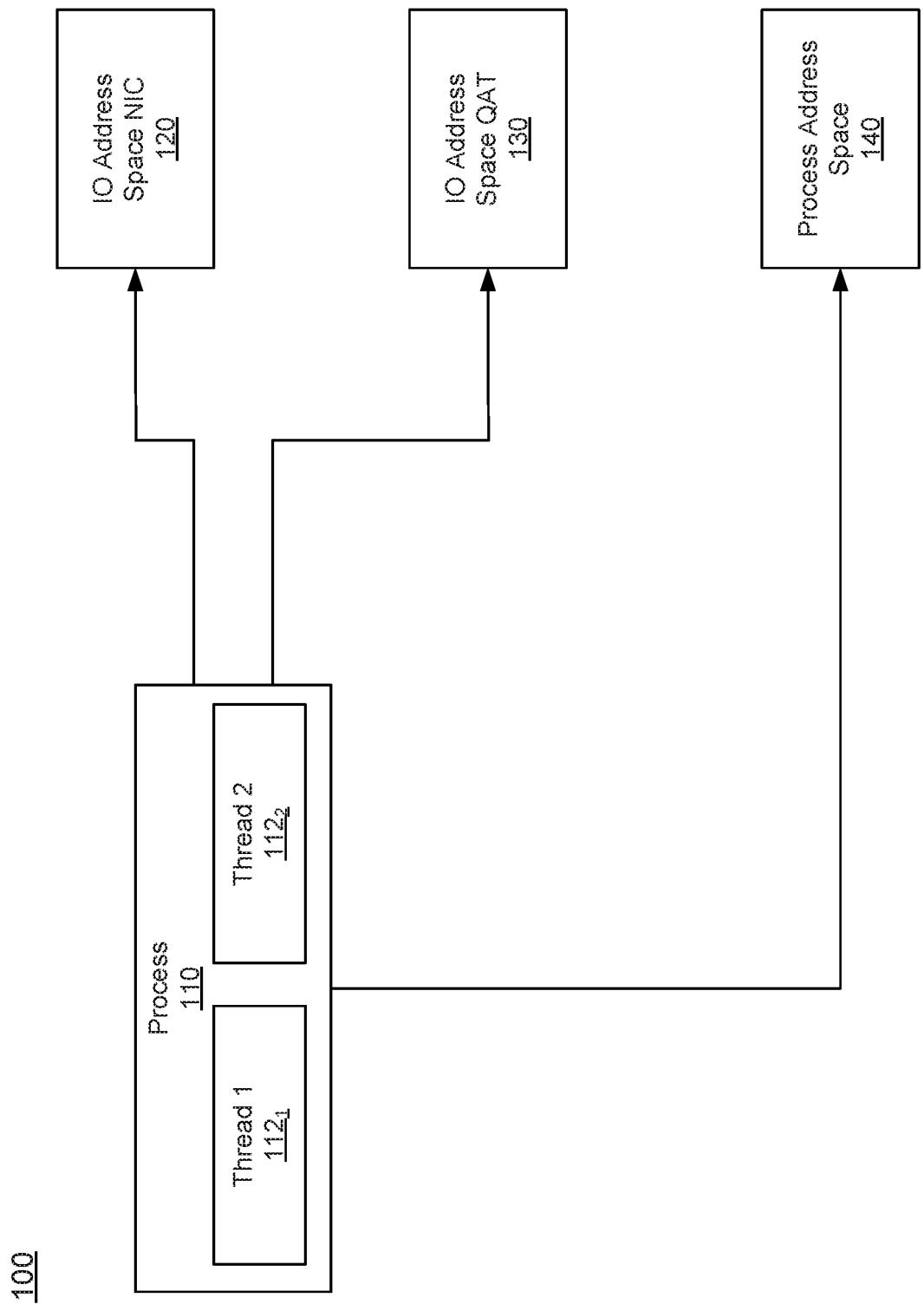
FIG. 1 is a block diagram of a process interaction with multiple address spaces in accordance with an embodiment.

Referring now to FIG. 1, shown is a block diagram of a process interaction with multiple address spaces in accordance with an embodiment. As shown in FIG. 1, within a computing system 100, a process 110 is in execution. In embodiments herein, assume that process 110 is a non-privileged client software such as application, driver, VM or so forth. As illustrated, process 110 itself includes multiple threads, namely a first thread $112_1$ and a second thread $112_2$. Process 110 interacts with a NIC 120 using PASID X, and interacts with an Intel® Quick Assist Technology (QAT) device 130 using PASID Y. And as further illustrated, process 110 (and its included threads 112) also may seek to access an SVM-capable Data Streaming Accelerator) (DSA) device 140 with PASID Z.

With embodiments herein, enqueue command-based instructions and hardware structures may be used to enable efficient access to multiple address spaces, leveraging PASID information of the different address spaces. If thread $112_1$ is receiving a packet from NIC 120, and copying it using DSA device 140, without an embodiment an MSR switch of the PASID from X to Z would occur. Since a PASID MSR is only controlled/managed by the operating system (OS), such operation becomes difficult.

Instead with embodiments, more ready access to different address spaces with different PASIDs may occur without switching a PASID stored in a PASID MSR. To this end, a PASID handle may be used to address these limitations and enable the use cases stated above.

Embodiments further may be used for software compartmentalization (e.g., serverless web-assembly, lightweight virtualization), where a process may have multiple address spaces (and potentially different page tables for each compartment) that are mapping different set/amount of memory. Embodiments may provide an additional level of indirection (e.g., Thread-ASID, PASID Handle, IO-ASID) to identify sub-process address spaces.

Figure 2:
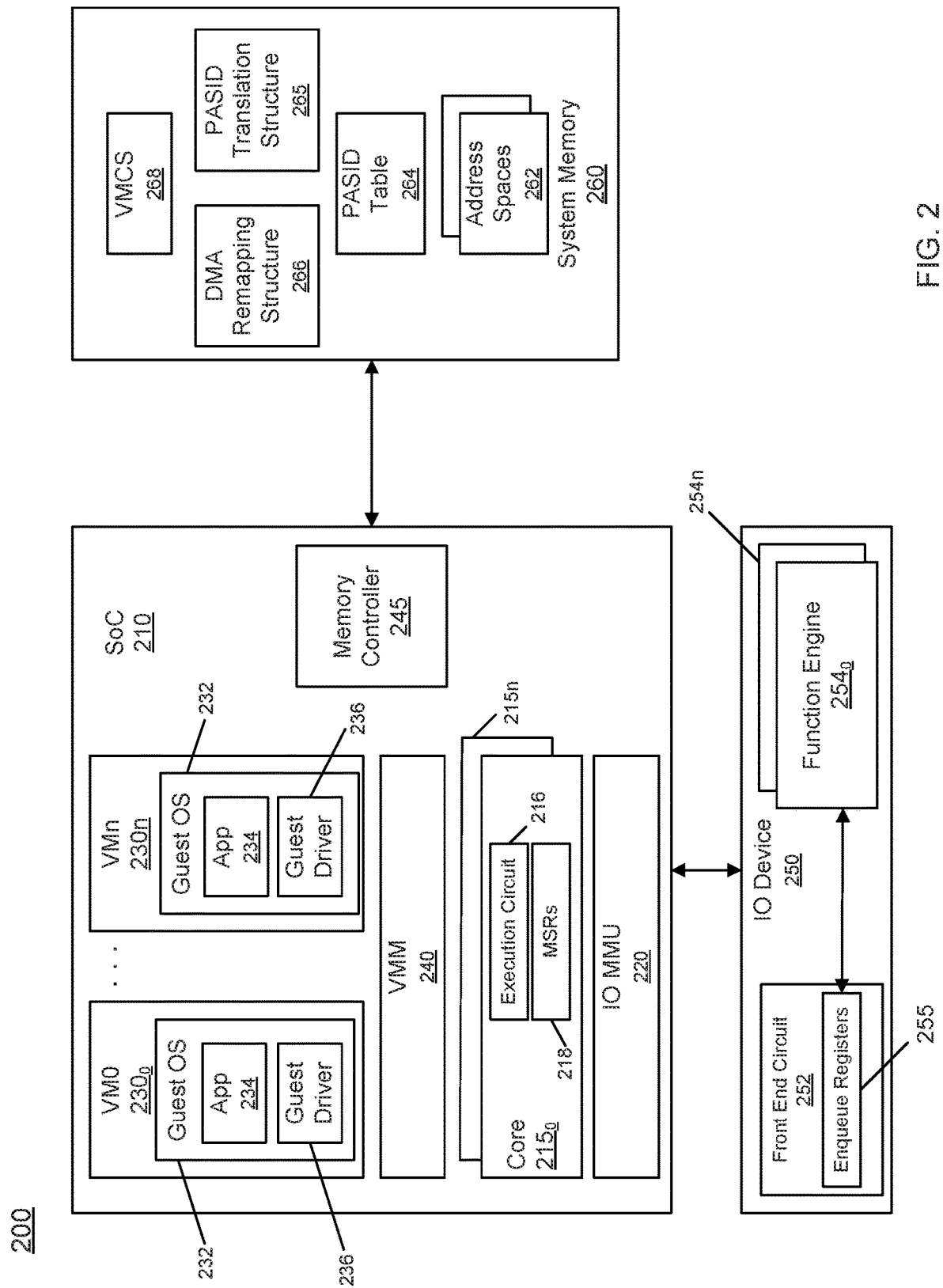
FIG. 2 is a block diagram of a system in accordance with an embodiment.

Referring now to FIG. 2, shown is a block diagram of a system in accordance with an embodiment. As shown in FIG. 2, system 200 may be any type of computing system, ranging from small portable devices to client-based systems or server-based systems. In the high level shown, a system on chip (SoC) 210 or other such processor couples to a system memory 260 and an I/O device 250. While shown with only these few components for ease of discussion, understand that a given computing system may include many more components. Further, while a single I/O device 250 is shown, understand that in embodiments there may be multiple I/O devices coupled to SoC 210. In addition, many systems, particularly server-based systems, may include multiple SoC's and system memory.

First with reference to SoC 210, shown are a plurality of cores $215_0$-$215_n$. In different embodiments, cores 215 may be homogeneous or heterogeneous cores, e.g., having different capabilities with regard to power consumption, instruction set capabilities and so forth. In the high level shown in FIG. 2, each core 215 may include at least one execution circuit 216, which may receive and execute instructions. In addition, each core 215 may include a plurality of MSRs 218. In embodiments herein, one or more MSRs, which may be implemented as configuration registers, may be configured to store PASID information for use in execution of particular instructions of an instruction set architecture as described herein.

To enable communication of requests from I/O device 250 to memory controller 245, an I/O memory management unit (IOMMU) 220 may be provided. In embodiments herein, IOMMU 220 may be configured to translate an incoming virtual address using DMA remapping structures, e.g., of a virtual address to a corresponding physical address.

In the embodiment of FIG. 2, SoC 210 is shown to include support for virtualization. Specifically, SoC 210 may be virtualized under control of a virtual machine monitor (VMM) 240 or other virtualization orchestration layer such as a hypervisor or so forth. As is known, VMM 240 may instantiate one or more virtual environments. In the embodiment shown in FIG. 2, VMM 240 may instantiate a plurality of virtual environments or guests $230_0$-$230_n$. Each virtualization environment 230 may be implemented as a virtual machine that includes a guest OS 232 on which one or more applications 234 may execute. In addition, a guest driver 236 may be provided.

In embodiments herein, virtualization environments 230 may issue requests including I/O write requests to one or more address spaces. With embodiments herein PASID information may be used in connection with these I/O write requests, such that a request (e.g., from a given application 234) of a first address space may write information to another address space. And with multiple such write requests, this first address space may issue write requests to multiple address spaces.

To enable interaction with system memory 260, a memory controller 245 is provided. In the high level view shown in FIG. 2, various components of system memory 260 relevant herein are shown. As seen, system memory 260 may include a plurality of address spaces 262. Each address space 262 may be associated with a given process or sub-process such as a thread, I/O device or so forth. As will be described herein, to enable a request associated with one address space to access another address space, information in a PASID table 264 may be used. Still further, to provide address translations, e.g., between virtual addresses, physical addresses, guest virtual addresses and host physical addresses, one or more PASID translation structures 265 and one or more DMA remapping structures 266 also may be present. In addition, each virtualization environment 230 may be associated with a corresponding virtual machine control structure (VMCS) 268, also present in system memory 260.

Still referring to FIG. 2, I/O device 250 includes a front end circuit 252 that is configured to receive incoming requests from SoC 210. Such requests may include write requests, e.g., implemented as enqueue command instructions as described herein. In response to such requests, front end circuit 252 may access one of multiple enqueue registers 255. According to a write request, command data received may be written to a given one of a plurality of enqueue registers 255 according to a destination operand of an enqueue command instruction. In turn, the requests may be sent to one of a plurality of function engines $254_{0-n}$ within I/O device 250 for execution. Understand while shown at this high level in the embodiment of FIG. 2, many variations and alternatives are possible.

In an embodiment, multiple flavors of user-level ENQCMD instructions may be provided to allow non-privileged software to write commands to enqueue registers located in devices coupled to a processor such as peripheral component interconnect express (PCIe) devices, single root I/O virtualization (SR-IOV) devices or scalable I/O virtualization devices. These enqueue device registers may be accessed using memory-mapped I/O (MMIO). The ENQCMD instruction begins by reading 64 bytes of command data from its source memory operand. The instruction then formats those 64 bytes into command data with a format consistent with FIG. 12.

Figure 12:
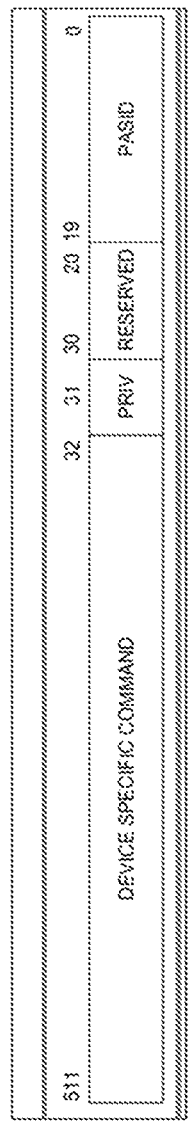
FIG. 12 is block diagram of an example arrangement of information stored in an enqueue register in accordance with an embodiment.

Referring now to FIG. 12, shown is an example arrangement of information stored in an enqueue register in accordance with an embodiment. As shown in FIG. 12, an enqueue register may be 512-bits and may include command, privilege, reserved and PASID fields to store information shown in FIG. 12.

As shown in FIG. 12, the stored information includes: Command[19:0] is a PASID. Command[30:20] are zero. Command[31] is 0 (indicating user). Command[511:32] is command data obtained from a memory read.

To enable access to multiple address space more efficiently, embodiments provide additional hardware structures and instructions. To this end, in one embodiment a given MSR may store an address of a PASID table. In one embodiment, this address is a physical address, and in other embodiments this address is a virtual address. This PASID table that is referenced by this MSR stores PASID values associated with different handles. In turn, a handle may be obtained from command data obtained in response to an enqueue command instruction.

In general, in response to a given enqueue command instruction (e.g., ENQCMDX r32/64, m512 or ENQCMD r32/64, m512), the following operations may proceed:
  Read 64 bytes of command data from a source memory operand
  Extract a PASID_TABLE_HANDLE (PTH) from the command data,
  Acquire a PASID table address from a PASIDX MSR,
  Index the PASID table using PTH extracted from the command data, and acquire the PASID value, and Populate this acquired PASID value in the command data (Command[19:0]).

In certain situations, a fault may result from execution of such instruction. For example, an instruction may return a general-protection exception when a "V" (Valid) bit is 0x0 in an MSR, or a "V" (Valid) bit in the PASID table entry selected based on PTH is 0x0. In an embodiment where the address stored in the MSR is a virtual address, there could be an additional fault condition associated with the PASID table or the page-tables pointing to the PASID table not being present in the physical first memory, resulting into a #PF (page-fault) exception.

In some embodiments, a hierarchical structure (e.g., PASID directory to PASID table) is referenced by the MSR, and this multi-level structure is indexed/looked-up with the use of PTH to acquire the PASID information. And in some embodiments, note that when running in a virtualized environment, a PASID value may be translated/converted from a guest PASID value to a host PASID value, e.g., using a PASID translation structure, before command data is sent to a destination.

Figure 3A:
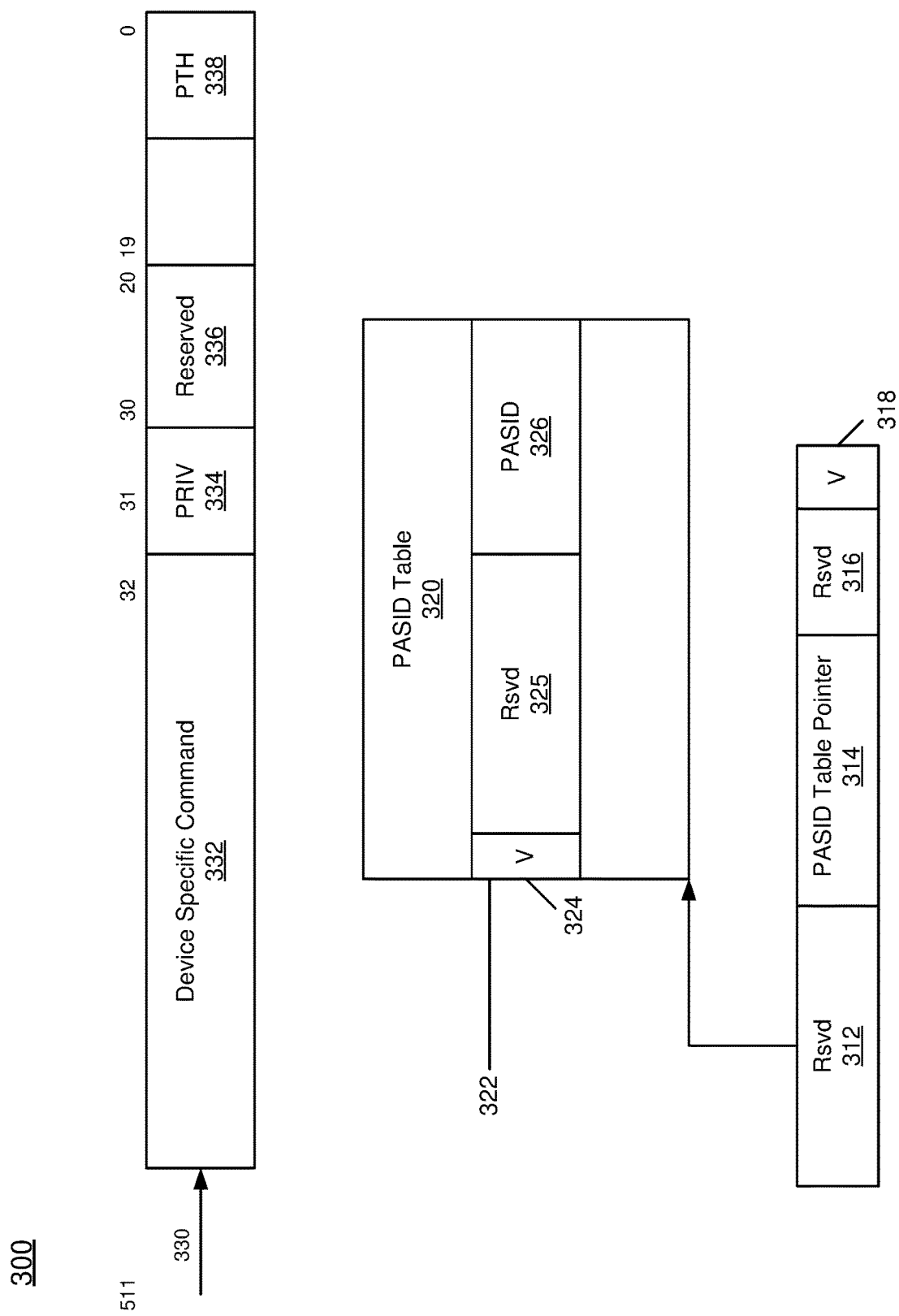
FIG. 3A is a block diagram of a portion of a processor in accordance with an embodiment.

Referring now to FIG. 3A, shown is a block diagram of a portion of a processor in accordance with an embodiment. As shown in FIG. 3A, a processor 300 may include various hardware structures to enable execution of a first user-level instruction of an ISA to perform enqueue register writes. As illustrated in FIG. 3A, processor 300 includes a first MSR 310, referred to herein as a PASIDX MSR. As shown, first MSR 310 includes a plurality of fields, each to store various information. As shown, a PASID table pointer may be stored in a PASID table pointer field 314 and a valid indicator may be stored in a valid field 318. As further shown, first MSR 310 may also include reserved fields 312, 316.

As discussed above, the PASID table pointer stored in PASID table pointer field 314 may be used to identify an address, e.g., in a system memory of a PASID table 320. Note that in various embodiments, at least a portion of a PASID table may be stored within a processor, e.g., in a cache memory. The PASID table pointer may point to a base address of PASID table 320. As illustrated, PASID table 320 may include a plurality of entries 322, each of which is to store various information. In the embodiment shown, each entry 322 includes a valid field 324 to store a valid indicator and a PASID field 326 store a PASID value. As further shown, each entry 322 also may include a reserved field 325.

To index into PASID table 320, a PASID table handle may be used to identify a given entry. Thus as further illustrated in FIG. 3A, a command data 330, e.g., obtained from a system memory location identified by the source operand of the first user-level instruction, may include this PASID table handle in a PASID table handle field 338. As further illustrated, command data 330 also may include device specific command information stored in a command field 332, a privilege indicator stored in a privilege field 334, and a reserved field 336.

Thus in the embodiment shown in FIG. 3A, in response to this first user-level instruction, a PASID table pointer may be obtained from first MSR 310 to access PASID table 320 and in turn a given entry may be accessed via indexing using a PASID table handle received within command data 330. Other implementations of course are possible.

Figure 3B:
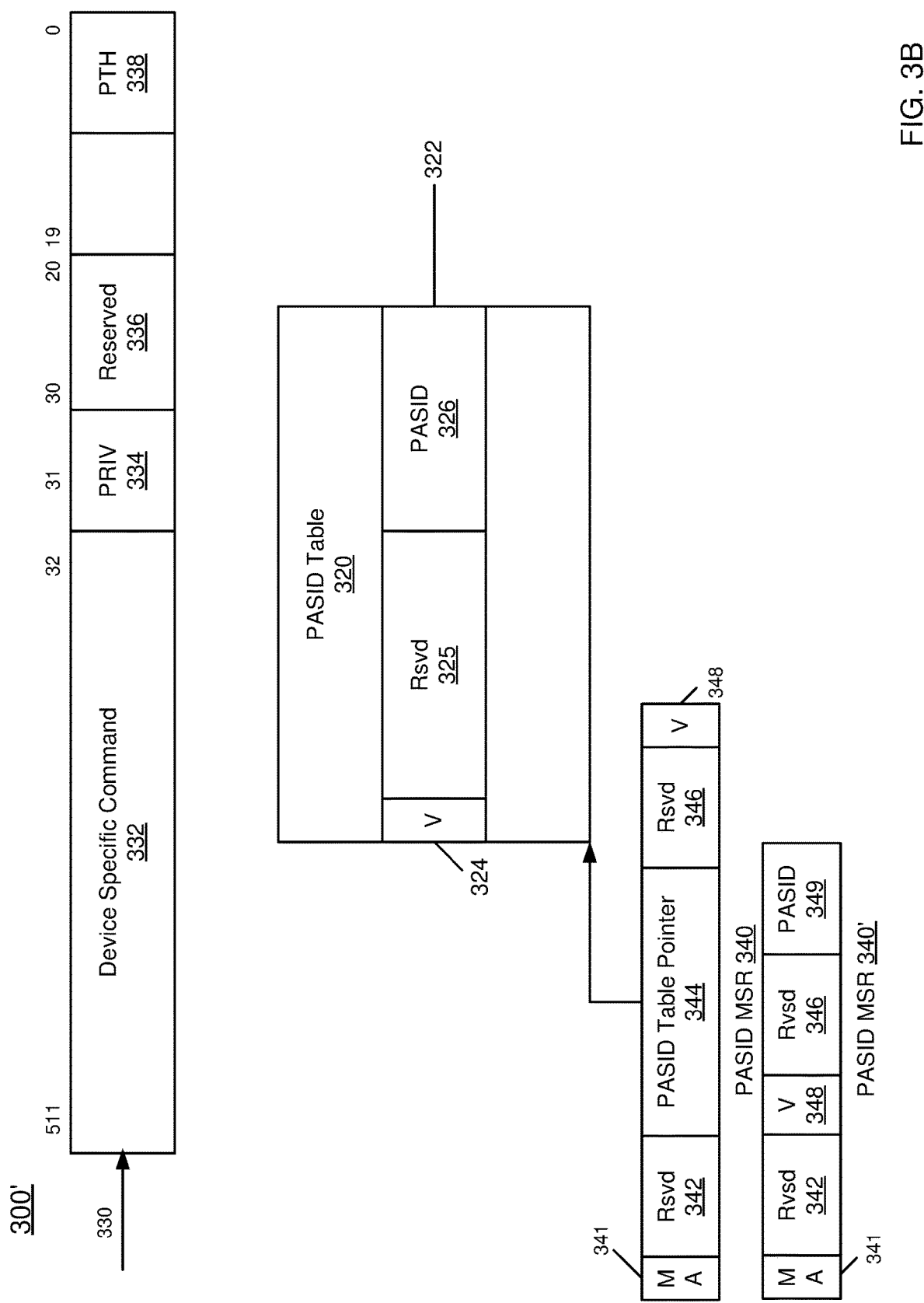
FIG. 3B is a block diagram of a portion of a processor in accordance with another embodiment

For example, in another embodiment a second user-level instruction of an ISA may be used to access a PASID table. In this embodiment, a PASID MSR, which is conventionally configured to store a PASID value, may be re-purposed to store a PASID table pointer. Referring now to FIG. 3B, shown is a block diagram of a portion of a processor in accordance with another embodiment. As shown in FIG. 3B, a processor 300' may be similarly configured as processor 300 of FIG. 3A, including a PASID table 320 include various hardware structures to enable execution of a first user-level instruction of an ISA to perform enqueue register writes. As illustrated in FIG. 3B, processor 300' includes a second MSR 340, namely a PASID MSR. As shown, PASID MSR 340 includes a plurality of fields, each to store various information. As shown, a PASID table pointer may be stored in a PASID table pointer field 344 and a valid indicator may be stored in a valid field 348. As further shown, PASID MSR 340 may also include reserved fields 342, 346. In addition, PASID MSR 340 includes a multiple address space field 341 to store a multiple address (MA) spaces indicator. The MA spaces indicator may be configured by an OS based on whether address space selection is allowed for the process or not. When the MA bit is 0x0 (as in PASID MSR 340'), the MSR follows a legacy layout/format that has reserved fields, 342, 346, valid field 348, and a PASID field 349. When the MA bit is 0x0, an application is not allowed to specify a PTH in the command data PTH field (i.e., it must be 0x0). To this end, a fault condition may cause the instruction to return a #GP exception when a non-zero PTH value is provided when the MA bit is 0x0. When the MA bit is 0x1, PASID MSR 340 has a layout as shown in FIG. 3B, and allows selection of a PASID from the PASID table based on the PTH provided in the command data.

Figure 3C:
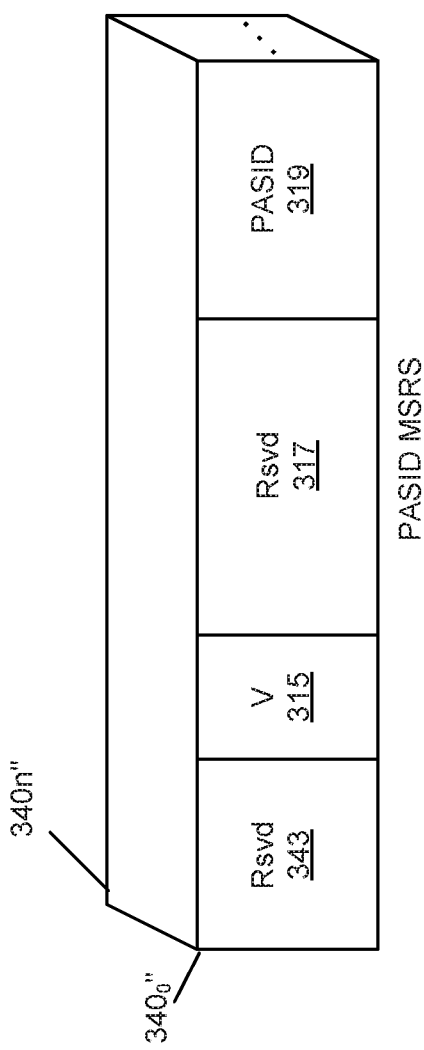
FIG. 3C is a block diagram of model specific registers in accordance with an embodiment.

In yet another embodiment, instead of obtaining PASID information from the PASID table, PASID values may be obtained directly from MSR's. To this end, another user-level instruction may cause an execution circuit to obtain a PASID value from one of a plurality of PASID MSR's. Referring now to FIG. 3C, shown is a block diagram of a plurality of PASID MSR's in accordance with an embodiment. As shown in FIG. 3C, a plurality of PASID MSR's 340" may be provided. A given one of MSR's 340" may be selected to obtain a valid indicator from valid field 315 and corresponding PASID value from PASID field 319 using a PASID table handle.

Each of MSRs 340" are provided to store a PASID value associated with a different handle, and a corresponding MSR is looked-up to determine a PASID value associated with the PTH. For example, for a PTH value of n, the nth MSR is accessed to determine the PASID value to populate in command store data. The instruction may return a #GP exception when the PTH value is out-of-bounds (i.e., not associated MSR with the PTH value provided).

Figure 3D:
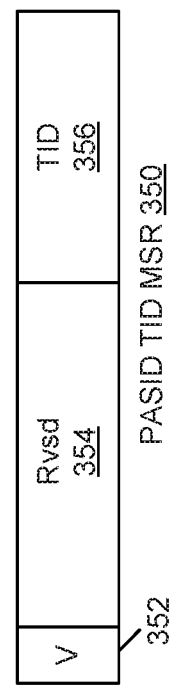
FIG. 3D is a block diagram of a model specific register in accordance with another embodiment.

In yet another embodiment, another MSR may store a thread ID. This MSR may be called a PASID TID MSR. On the submission of an ENQCMD instruction, the thread ID is picked up from this MSR and used as a handle (PTH) to index the PASID table. In yet another embodiment, a thread ID picked up from this MSR is concatenated with an original PTH field of command data to create a final handle (a final PTH) to index the PASID table. In this way, different threads of the same process can use different address spaces. Referring now to FIG. 3D, shown is a block diagram of a PASID thread identifier MSR 350. As shown in FIG. 3D, thread identifier MSR 350 include a plurality of fields, including a valid field 352, a reserved field 354 and a thread identifier field 356. Understand while FIGS. 3A-3D show particular hardware structures for use in execution of various enqueue command instructions, many more hardware components may be involved in such instruction execution.

Figure 4:
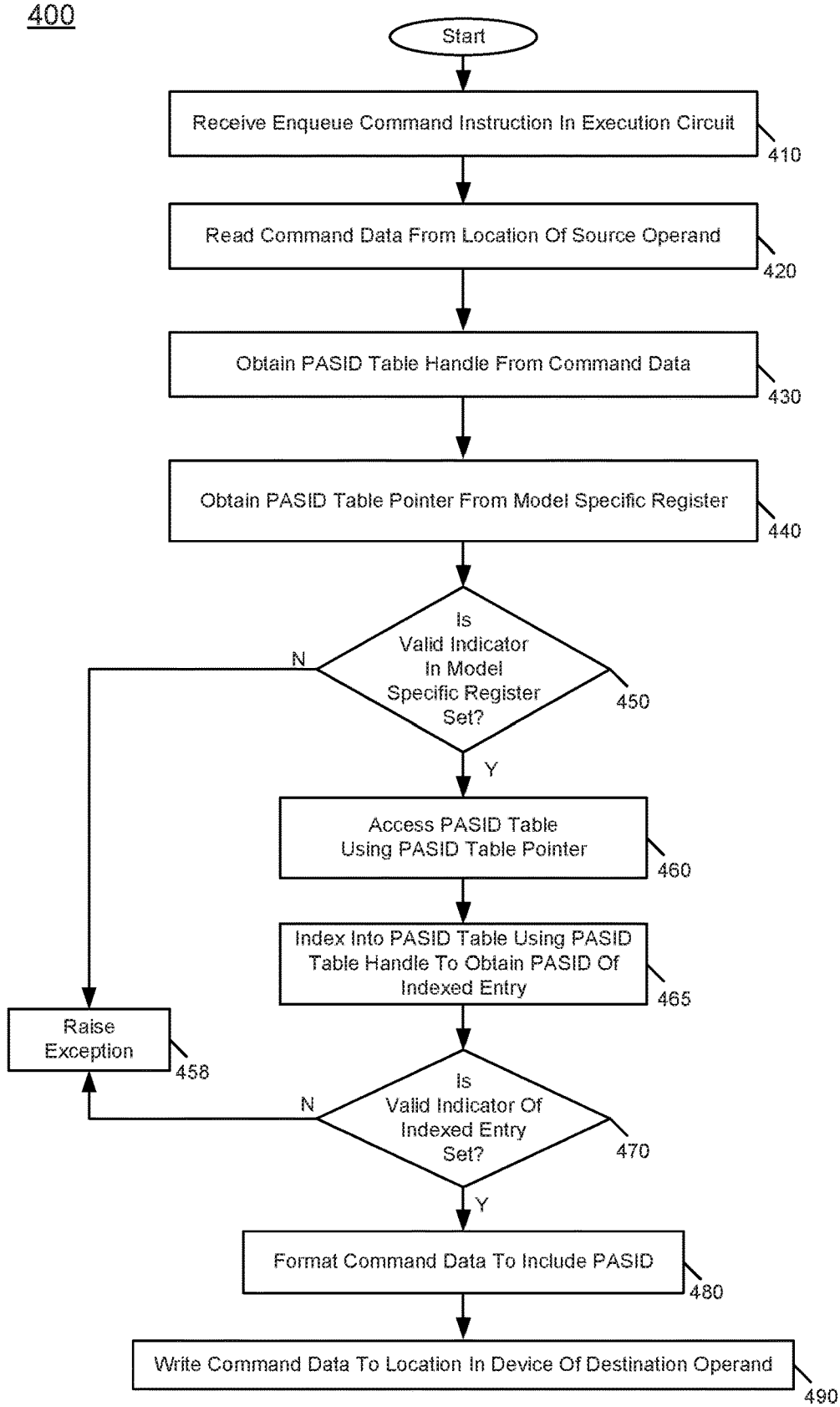
FIG. 4 is a flow diagram of a method in accordance with one embodiment.

Referring now to FIG. 4, shown is a flow diagram of a method in accordance with one embodiment. As shown in FIG. 4, method 400 is a method for executing a first enqueue command instruction. Method 400 may be performed by an execution circuit of a processor, after fetch by an instruction fetch circuit and decode in an instruction decode circuit. As such, method 400 may be performed by hardware circuitry, firmware, microcode, a combination thereof or the like. As illustrated, method 400 begins by receiving an enqueue command instruction in the execution circuit (block 410). Assume that this enqueue command instruction is: ENQCMD r32/64, m512 or ENQCMDX r32/64, m512. Here, m512 is to identify a source operand and r32/64 identifies a destination operand, which may be present in a device, e.g., an enqueue register (and the "X" identifies access to a PASIDX MSR). Next in response to this instruction the execution circuit may read command data, which it obtains from a location identified by a source operand of the instruction (block 420). Although embodiments are not limited in this regard, in one example this location may be present in an address space of an issuer of the instruction, e.g., an address space of a process that issued the instruction.

Still with reference to FIG. 4 next at block 430 a PASID table handle may be obtained from the command data. As discussed above, in one implementation least significant bits of the command data may include this PASID table handle. Also in response to this first enqueue command instruction, a PASID table pointer may be obtained from a MSR (block 440). In this implementation, this MSR may be a PASIDX MSR or a PASID MSR configured for MA operation.

Then it may be determined at diamond 450 whether a valid indicator in this MSR is set. If not, no further analysis occurs, and instead an exception such as a general protection exception may be raised (block 458). Otherwise when it is determined that the valid indicator is set, next at block 460 the PASID table may be accessed using the PASID table pointer, which may be used to identify a base address of this table. In turn, at block 465 the PASID table handle may be used to index into the PASID table to identify an indexed entry from which a PASID value may be obtained. Next at diamond 470 it is determined whether a valid indicator in this entry is set. If not, no further analysis occurs and an exception is raised (block 458).

Otherwise when it is determined that the valid indicator is set, the execution circuit may format the command data to include this PASID value (block 480). For example, the execution circuit may insert this PASID value into the least significant bits of the command data (thus overriding the PASID table handle, as it is no longer needed). Finally, at block 490 this command data may be written to a location in a device such as an I/O device. More specifically, in response to the instruction the execution circuit may cause this command data to be written into a particular location in the I/O device identified by a destination operand of the instruction. In particular embodiments herein this location may be a given enqueue register of the device. Understand that to effect this write, the execution circuit may send the command data through a processor hierarchy, including an MMU. Understand while shown at this high level in the embodiment of FIG. 4, many variations and alternatives are possible.

Figure 5:
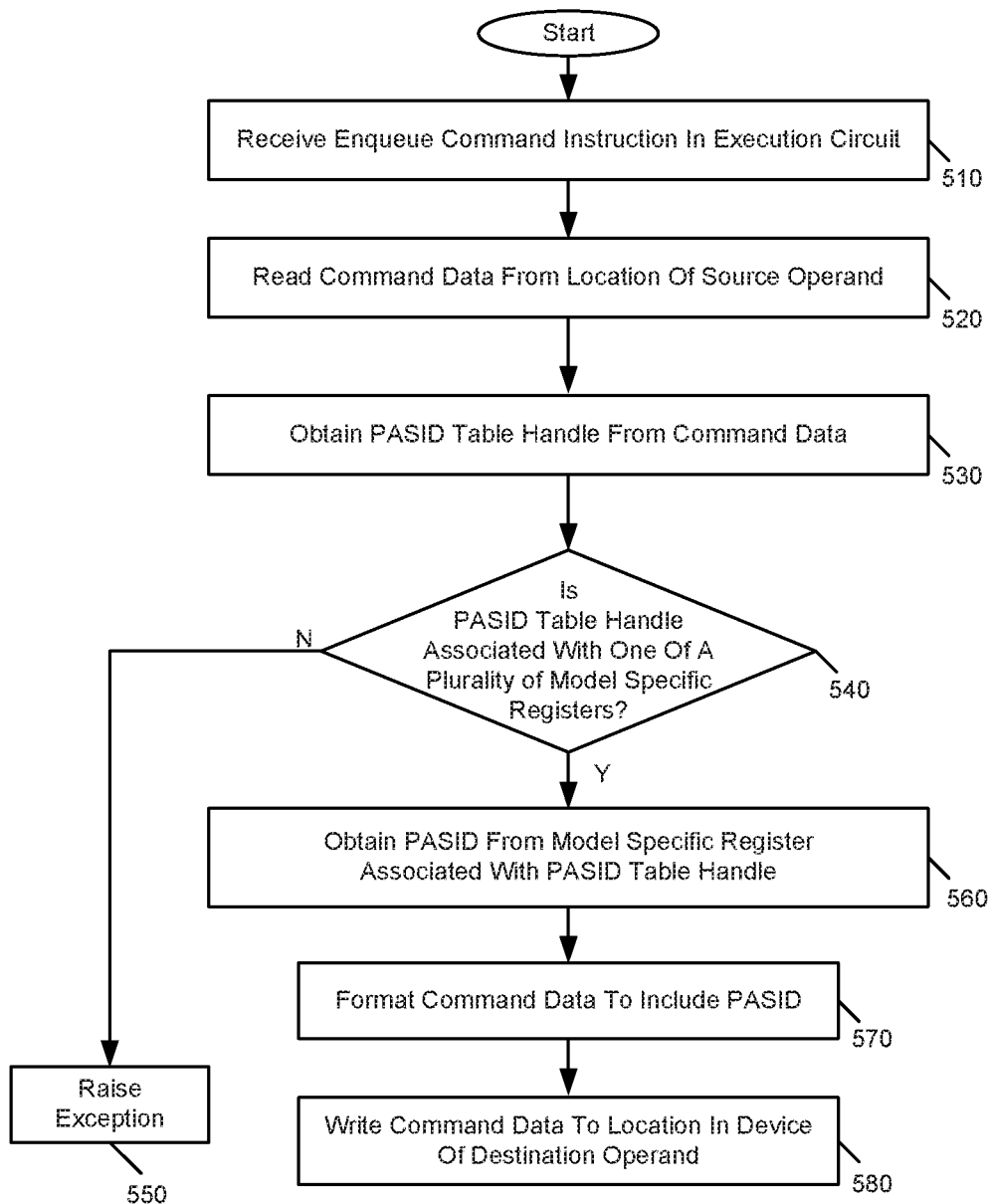
FIG. 5 is a flow diagram of a method in accordance with another embodiment.

Referring now to FIG. 5, shown is a flow diagram of a method in accordance with another embodiment. As shown in FIG. 5, method 500 is a method for executing an enqueue command instruction that accesses PASID information from one of multiple MSRs. As such, method 500 may be performed by an execution circuit of a processor, and/or other hardware circuitry, firmware, microcode, a combination thereof or the like. As illustrated, method 500 begins by receiving an enqueue command instruction in the execution circuit (block 510). In response to this instruction the execution circuit may read command data, which it obtains from a location identified by a source operand of the instruction (block 520). Then at block 530 a PASID table handle may be obtained from the command data.

Still referring to FIG. 5, next it may be determined whether one of the multiple MSR's is associated with the obtained PASID table handle. If so at block 560, a PASID value from this accessed MSR associated with the PASID table handle may be obtained. Note that prior to obtaining this PASID value, it may first be determined whether a valid indicator of the MSR is set. At block 570 the execution circuit may format the command data to include this PASID value. Finally, at block 580 this command data may be written to a location in a device such as a given enqueue register identified by a destination operand of the instruction. Understand while shown at this high level in the embodiment of FIG. 5, many variations and alternatives are possible.

Figure 6:
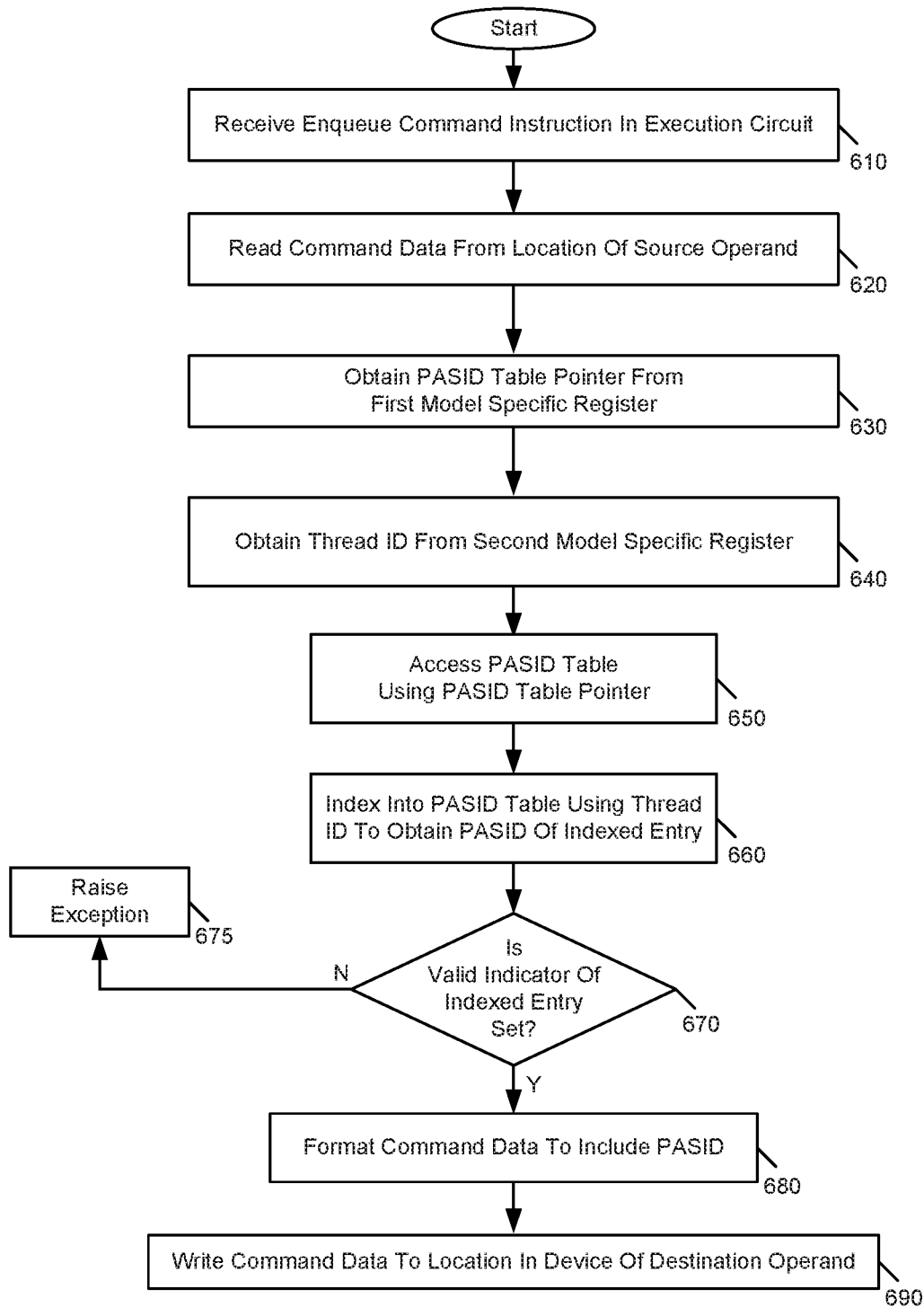
FIG. 6 is a flow diagram of a method in accordance with yet another embodiment.

Referring now to FIG. 6, shown is a flow diagram of a method in accordance with yet another embodiment. As shown in FIG. 6, method 600 is a method for executing an enqueue command instruction that accesses PASID information using sub-process information, namely thread information of a given thread of an application. As such, method 600 may be performed by an execution circuit of a processor, and/or other hardware circuitry, firmware, microcode, a combination thereof or the like. As illustrated, method 600 begins by receiving an enqueue command instruction in the execution circuit (block 610). Next in response to this instruction the execution circuit may read command data, which it obtains from a location identified by a source operand of the instruction (block 620). Then at block 630 a PASID table pointer may be obtained from a first MSR (e.g., a PASIDX MSR), assuming a valid indicator of the first MSR is set.

Still referring to FIG. 6, next at block 640 a thread identifier may be obtained from another MSR (e.g., a thread ID MSR), assuming a valid indicator of this MSR is set. At block 650 the PASID table may be accessed using the PASID table pointer, which may be used to identify a base address of this table. In turn, at block 660 the thread identifier may be used to index into the PASID table to identify an indexed entry from which a PASID value may be obtained. Next at diamond 670 it is determined whether a valid indicator in this entry is set. If not, no further analysis occurs and an exception is raised (block 675). Otherwise at block 680 the execution circuit may format the command data to include this PASID value. Finally, at block 690 this command data may be written to a location in a device such as a given enqueue register identified by a destination operand of the instruction. Understand while shown at this high level in the embodiment of FIG. 6, many variations and alternatives are possible.

As described above, MSRs and other structures to implement PASID-based requests may be integrated within a processor or other SoC. Such processor may include processor cores that may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Figure 7A:
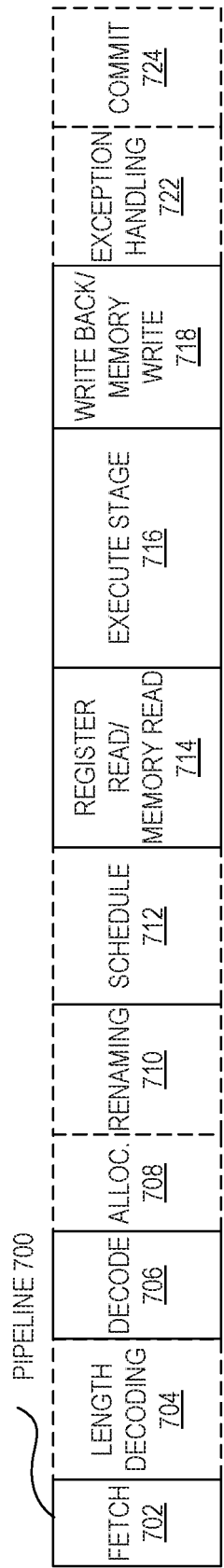
FIGS. 7A and 7B illustrate a block diagram of a more specific exemplary in-order core architecture.
Figure 7B:
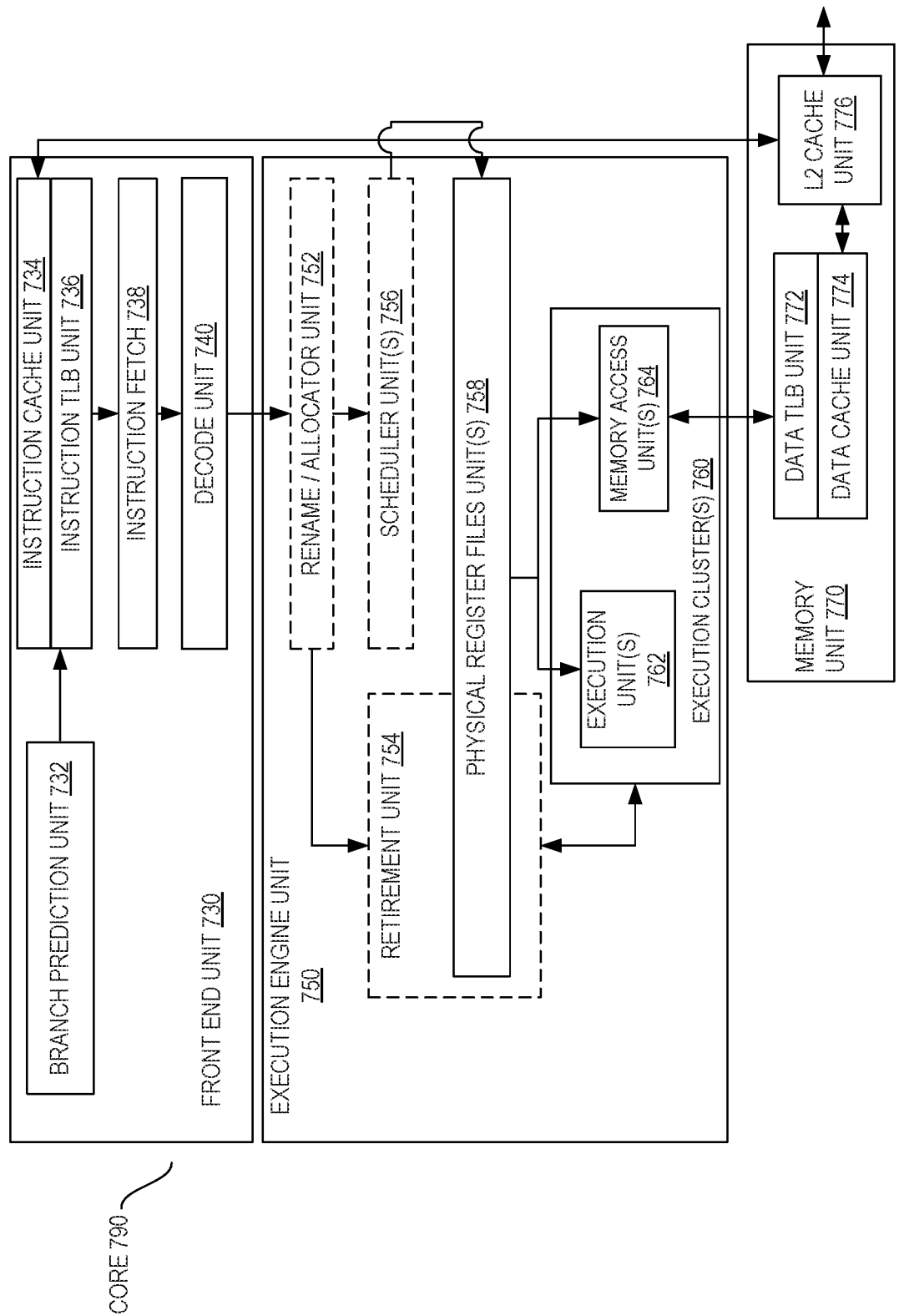

FIG. 7A is a block diagram illustrating both an exemplary in-order pipeline and an exemplary register renaming, out-of-order issue/execution pipeline according to embodiments of the invention. FIG. 7B is a block diagram illustrating both an exemplary embodiment of an in-order architecture core and an exemplary register renaming, out-of-order issue/execution architecture core to be included in a processor according to embodiments of the invention. The solid lined boxes in FIGS. 7A and 7B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 7A, a processor pipeline 700 includes a fetch stage 702, a length decode stage 704, a decode stage 706, an allocation stage 708, a renaming stage 710, a scheduling (also known as a dispatch or issue) stage 712, a register read/memory read stage 714, an execute stage 716, a write back/memory write stage 718, an exception handling stage 722, and a commit stage 724. Note that as described herein, in a given embodiment a core may include multiple processing pipelines such as pipeline 700.

FIG. 7B shows processor core 790 including a front end unit 730 coupled to an execution engine unit 750, and both are coupled to a memory unit 770. The core 790 may be a reduced instruction set computing (RISC) core, a complex instruction set computing (CISC) core, a very long instruction word (VLIW) core, or a hybrid or alternative core type. As yet another option, the core 790 may be a special-purpose core, such as, for example, a network or communication core, compression engine, coprocessor core, general purpose computing graphics processing unit (GPGPU) core, graphics core, or the like.

The front end unit 730 includes a branch prediction unit 732 coupled to an instruction cache unit 734, which is coupled to an instruction translation lookaside buffer (TLB) 736, which is coupled to an instruction fetch unit 738, which is coupled to a decode unit 740. The decode unit 740 (or decoder) may decode instructions, and generate as an output one or more micro-operations, micro-code entry points, microinstructions, other instructions, or other control signals, which are decoded from, or which otherwise reflect, or are derived from, the original instructions. The decode unit 740 may be implemented using various different mechanisms. Examples of suitable mechanisms include, but are not limited to, look-up tables, hardware implementations, programmable logic arrays (PLAs), microcode read only memories (ROMs), etc. In one embodiment, the core 790 includes a microcode ROM or other medium that stores microcode for certain macroinstructions (e.g., in decode unit 740 or otherwise within the front end unit 730). The decode unit 740 is coupled to a rename/allocator unit 752 in the execution engine unit 750.

The execution engine unit 750 includes the rename/allocator unit 752 coupled to a retirement unit 754 and a set of one or more scheduler unit(s) 756. The scheduler unit(s) 756 represents any number of different schedulers, including reservations stations, central instruction window, etc. The scheduler unit(s) 756 is coupled to the physical register file(s) unit(s) 758. Each of the physical register file(s) units 758 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 758 comprises a vector registers unit, a write mask registers unit, and a scalar registers unit. These register units may provide architectural vector registers, vector mask registers, and general purpose registers. The physical register file(s) unit(s) 758 is overlapped by the retirement unit 754 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 754 and the physical register file(s) unit(s) 758 are coupled to the execution cluster(s) 760. The execution cluster(s) 760 includes a set of one or more execution units 762 and a set of one or more memory access units 764. The execution units 762 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 756, physical register file(s) unit(s) 758, and execution cluster(s) 760 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 764). It should also be understood that where separate pipelines are used, one or more of these pipelines may be out-of-order issue/execution and the rest in-order.

The set of memory access units 764 is coupled to the memory unit 770, which includes a data TLB unit 772 coupled to a data cache unit 774 coupled to a level 2 (L2) cache unit 776. In one exemplary embodiment, the memory access units 764 may include a load unit, a store address unit, and a store data unit, each of which is coupled to the data TLB unit 772 in the memory unit 770. The instruction cache unit 734 is further coupled to a level 2 (L2) cache unit 776 in the memory unit 770. The L2 cache unit 776 is coupled to one or more other levels of cache and eventually to a main memory.

By way of example, the exemplary register renaming, out-of-order issue/execution core architecture may implement the pipeline 700 as follows: 1) the instruction fetch 738 performs the fetch and length decoding stages 702 and 704; 2) the decode unit 740 performs the decode stage 706; 3) the rename/allocator unit 752 performs the allocation stage 708 and renaming stage 710; 4) the scheduler unit(s) 756 performs the schedule stage 712; 5) the physical register file(s) unit(s) 758 and the memory unit 770 perform the register read/memory read stage 714; the execution cluster 760 perform the execute stage 716; 6) the memory unit 770 and the physical register file(s) unit(s) 758 perform the write back/memory write stage 718; 7) various units may be involved in the exception handling stage 722; and 8) the retirement unit 754 and the physical register file(s) unit(s) 758 perform the commit stage 724.

The core 790 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 790 includes logic to support a packed data instruction set extension (e.g., AVX1, AVX2), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 734/774 and a shared L2 cache unit 776, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 8:
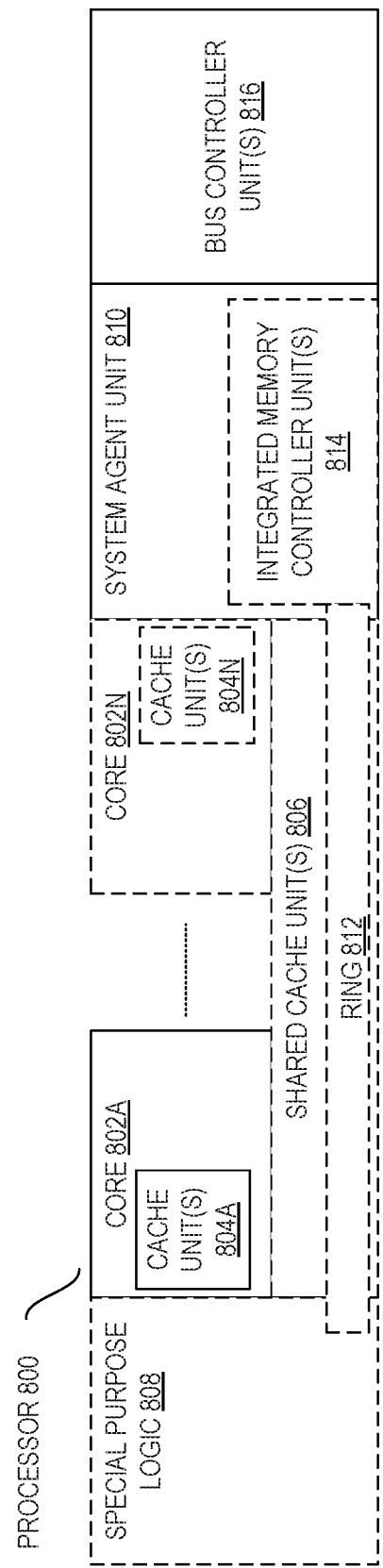
FIG. 8 is a block diagram of a processor that may have more than one core, may have an integrated memory controller, and may have integrated graphics according to embodiments of the invention.

FIG. 8 is a block diagram of a processor 800 that may have more than one core, may have an integrated memory controller, and may have integrated graphics according to embodiments of the invention. The solid lined boxes in FIG. 8 illustrate a processor 800 with a single core 802A, a system agent 810, a set of one or more bus controller units 816, while the optional addition of the dashed lined boxes illustrates an alternative processor 800 with multiple cores 802A-N, a set of one or more integrated memory controller unit(s) in the system agent unit 910, and special purpose logic 808.

Thus, different implementations of the processor 800 may include: 1) a CPU with the special purpose logic 808 being integrated graphics and/or scientific (throughput) logic (which may include one or more cores), and the cores 802A-N being one or more general purpose cores (e.g., general purpose in-order cores, general purpose out-of-order cores, a combination of the two); 2) a coprocessor with the cores 802A-N being a large number of special purpose cores intended primarily for graphics and/or scientific (throughput); and 3) a coprocessor with the cores 802A-N being a large number of general purpose in-order cores. Thus, the processor 800 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 800 may be a part of and/or may be implemented on one or more substrates using any of a number of process technologies, such as, for example, BiCMOS, CMOS, or NMOS.

The memory hierarchy includes one or more levels of cache units 804A-N within the cores, a set or one or more shared cache units 806, and external memory (not shown) coupled to the set of integrated memory controller units 814. The set of shared cache units 806 may include one or more mid-level caches, such as level 2 (L2), level 3 (L3), level 4 (L4), or other levels of cache, a last level cache (LLC), and/or combinations thereof. While in one embodiment a ring based interconnect unit 812 interconnects the special purpose logic 808, the set of shared cache units 806, and the system agent unit 810/integrated memory controller unit(s) 814, alternative embodiments may use any number of well-known techniques for interconnecting such units. In one embodiment, coherency is maintained between one or more cache units 806 and cores 802 A-N.

The system agent unit 810 includes those components coordinating and operating cores 802A-N. The system agent unit 810 may include for example a power control unit (PCU) and a display unit. The PCU may be or include logic and components needed for regulating the power state of the cores 802A-N and the special purpose logic 808. The display unit is for driving one or more externally connected displays.

The cores 802A-N may be homogenous or heterogeneous in terms of architecture instruction set; that is, two or more of the cores 802A-N may be capable of execution the same instruction set, while others may be capable of executing only a subset of that instruction set or a different instruction set.

Figure 9:
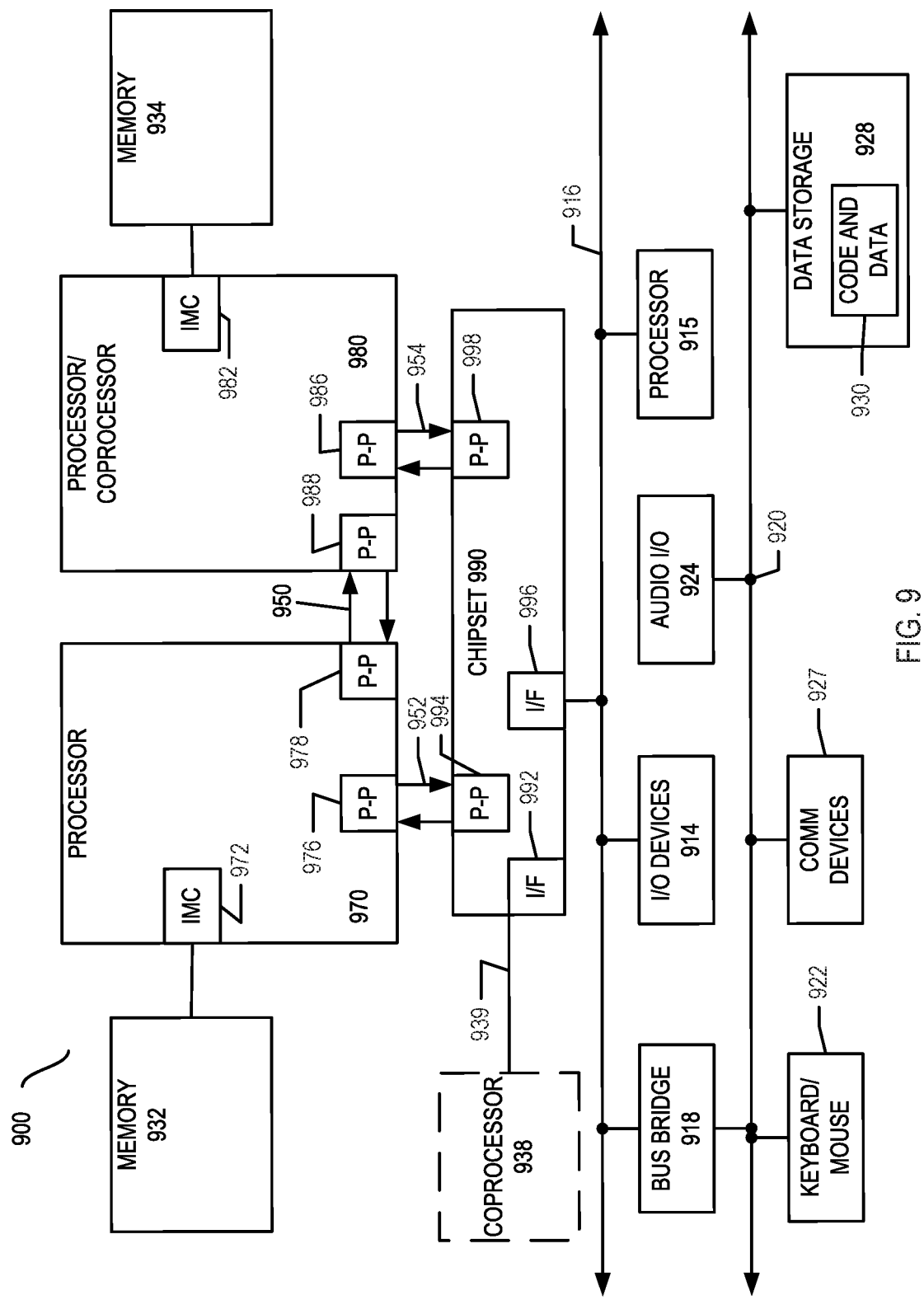
FIG. 9 is a block diagram of a first more specific exemplary system in accordance with an embodiment of the present invention
Figure 10:
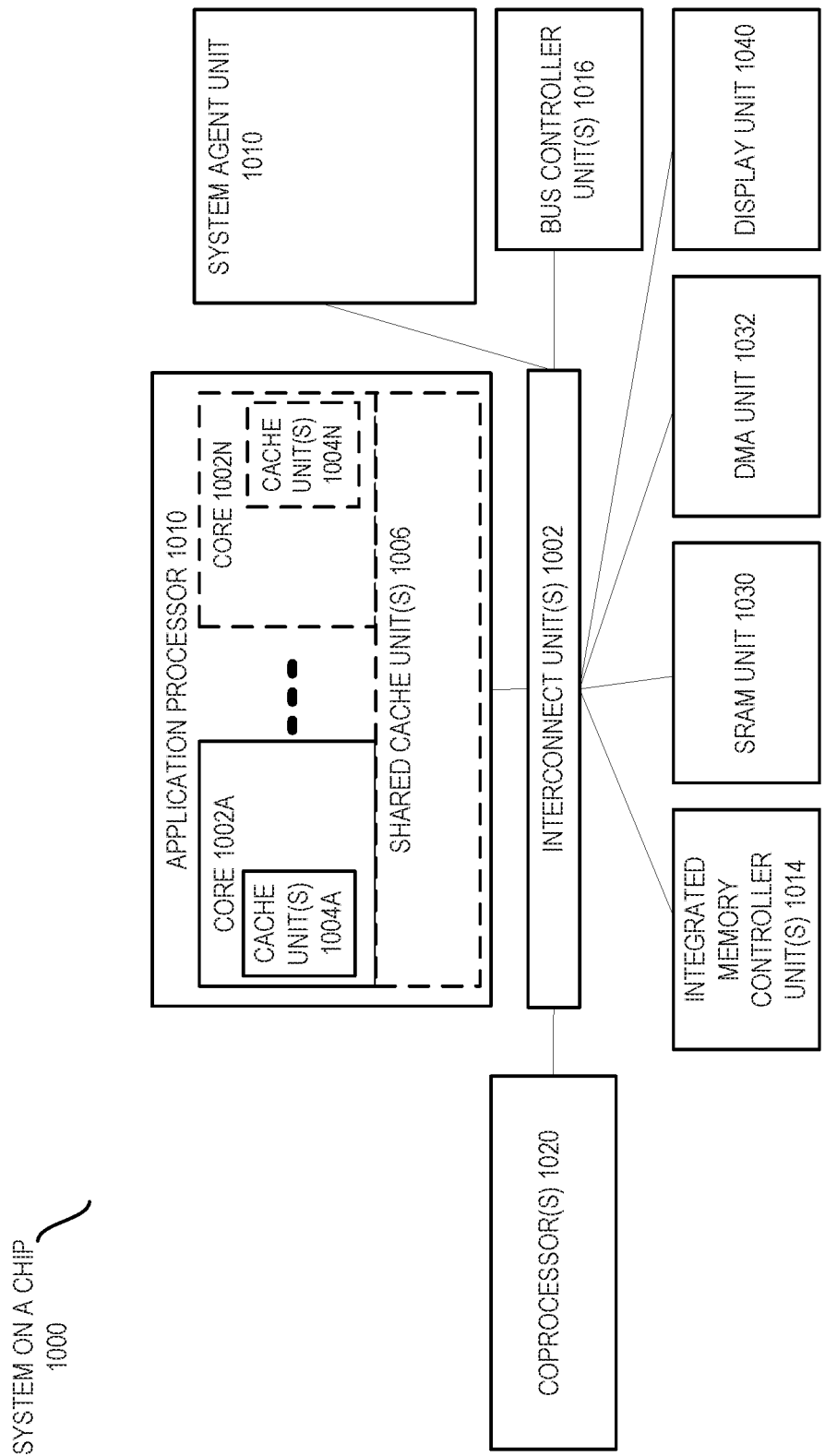
FIG. 10 is a block diagram of a SoC in accordance with an embodiment of the present invention.

FIGS. 9-10 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Referring now to FIG. 9, shown is a block diagram of a first more specific exemplary system 900 in accordance with an embodiment of the present invention. As shown in FIG. 9, multiprocessor system 900 is a point-to-point interconnect system, and includes a first processor 970 and a second processor 980 coupled via a point-to-point interconnect 950. Each of processors 970 and 980 may be some version of the processor 900.

Processors 970 and 980 are shown including integrated memory controller (IMC) units 972 and 982, respectively. Processor 970 also includes as part of its bus controller units point-to-point (P-P) interfaces 976 and 978; similarly, second processor 980 includes P-P interfaces 986 and 988. Processors 970, 980 may exchange information via a point-to-point (P-P) interface 950 using P-P interface circuits 978, 988. As shown in FIG. 9, IMCs 972 and 982 couple the processors to respective memories, namely a memory 932 and a memory 934, which may be portions of main memory locally attached to the respective processors.

Processors 970, 980 may each exchange information with a chipset 990 via individual P-P interfaces 952, 954 using point to point interface circuits 976, 994, 986, 998. Chipset 990 may optionally exchange information with the coprocessor 938 via a high-performance interface 939. In one embodiment, the coprocessor 938 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 990 may be coupled to a first bus 916 via an interface 996. In one embodiment, first bus 916 may be a Peripheral Component Interconnect (PCI) bus, or a bus such as a PCI Express bus or another third generation I/O interconnect bus, although the scope of the present invention is not so limited.

As shown in FIG. 9, various I/O devices 914 may be coupled to first bus 916, along with a bus bridge 918 which couples first bus 916 to a second bus 920. In one embodiment, one or more additional processor(s) 915, such as coprocessors, high-throughput MIC processors, GPGPU's, accelerators (such as, e.g., graphics accelerators or digital signal processing (DSP) units), field programmable gate arrays, or any other processor, are coupled to first bus 916. In one embodiment, second bus 920 may be a low pin count (LPC) bus. Various devices may be coupled to a second bus 920 including, for example, a keyboard and/or mouse 922, communication devices 927 and a storage unit 928 such as a disk drive or other mass storage device which may include instructions/code and data 930, in one embodiment. Further, an audio I/O 924 may be coupled to the second bus 920. Note that other architectures are possible. For example, instead of the point-to-point architecture of FIG. 9, a system may implement a multi-drop bus or other such architecture.

Referring now to FIG. 10, shown is a block diagram of a SoC 1000 in accordance with an embodiment of the present invention. Dashed lined boxes are optional features on more advanced SoCs. In FIG. 10, an interconnect unit(s) 1002 is coupled to: an application processor 1010 which includes a set of one or more cores 1002A-N (including constituent cache units 1004A-N) and shared cache unit(s) 1006; a system agent unit 1010; a bus controller unit(s) 1016; an integrated memory controller unit(s) 1014; a set or one or more coprocessors 1020 which may include integrated graphics logic, an image processor, an audio processor, and a video processor; a static random access memory (SRAM) unit 1030; a direct memory access (DMA) unit 1032; and a display unit 1040 for coupling to one or more external displays. In one embodiment, the coprocessor(s) 1020 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 930 illustrated in FIG. 9, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 11:
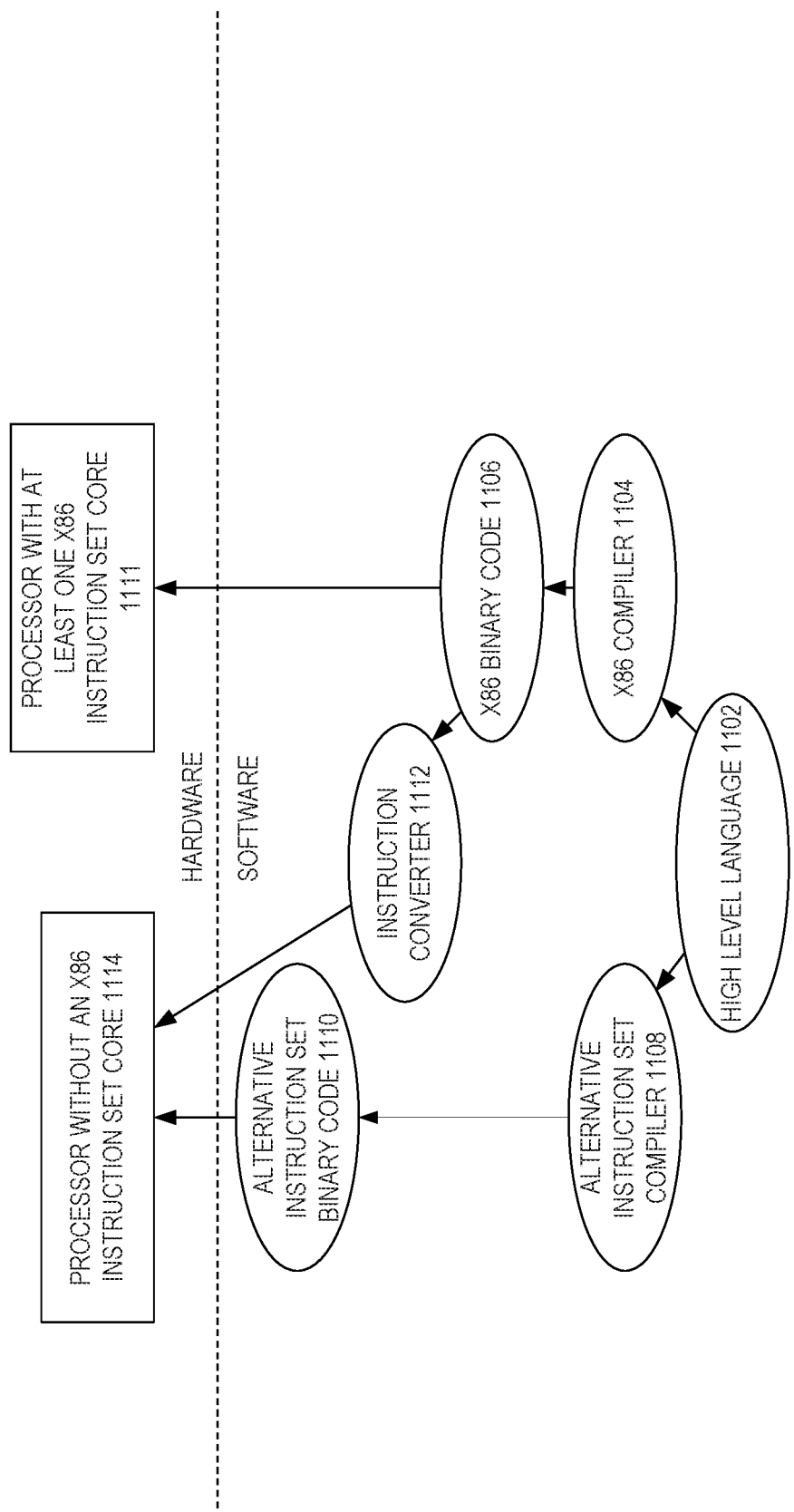
FIG. 11 is a block diagram contrasting the use of a software instruction converter to convert binary instructions in a source instruction set to binary instructions in a target instruction set according to embodiments of the invention.

FIG. 11 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 11 shows a program in a high level language 1102 may be compiled using an x86 compiler 1104 to generate x86 binary code 1106 that may be natively executed by a processor with at least one x86 instruction set core 1116. The processor with at least one x86 instruction set core 1116 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1104 represents a compiler that is operable to generate x86 binary code 1106 (e.g., object code) that can, with or without additional linkage processing, be executed on the processor with at least one x186 instruction set core 1116. Similarly, FIG. 11 shows the program in the high level language 1102 may be compiled using an alternative instruction set compiler 1108 to generate alternative instruction set binary code 1110 that may be natively executed by a processor without at least one x86 instruction set core 1114 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1112 is used to convert the x86 binary code 1106 into code that may be natively executed by the processor without an x86 instruction set core 1114. This converted code is not likely to be the same as the alternative instruction set binary code 1110 because an instruction converter capable of this is difficult to make; however, the converted code will accomplish the general operation and be made up of instructions from the alternative instruction set. Thus, the instruction converter 1112 represents software, firmware, hardware, or a combination thereof that, through emulation, simulation or any other process, allows a processor or other electronic device that does not have an x86 instruction set processor or core to execute the x86 binary code 1106.

The following examples pertain to further embodiments.

In one example, a processor includes: a first configuration register to store a pointer to a PASID table; and an execution circuit coupled to the first configuration register, where the execution circuit, in response to a first instruction, is to obtain command data from a first location identified in a source operand of the first instruction, obtain a PASID table handle from the command data, access a first entry of the PASID table using the pointer from the first configuration register and the PASID table handle to obtain a PASID value, insert the PASID value into the command data, and send the command data to a device coupled to the processor.

In an example, the execution circuit is to send the command data to a register of the device identified in a destination operand of the first instruction.

In an example, the device comprises an I/O device having a first I/O address space associated with the PASID value, and where the execution circuit is to receive the first instruction from a first application having a second address space associated with a second PASID value.

In an example, responsive to a second instruction from the first application, the execution circuit is to send second command data to a second device coupled to the processor, the second device having a third address space associated with a third PASID value.

In an example, if a valid indicator of the first configuration register is not set, the execution circuit is to raise an exception and not access the PASID table.

In an example, if a valid indicator of the first entry of the PASID table is not set, the execution circuit is to raise an exception and not insert the PASID value into the command data.

In an example, the first configuration register comprises a PASID model specific register, the PASID model specific register comprising a first field to store a multiple address indicator which, when set, indicates that the PASID model specific register includes the pointer to the PASID table.

In an example, when the multiple address space indicator is reset, the PASID model specific register is to store the PASID value, and the execution circuit is not to access the PASID table, and when the multiple address space indicator is reset, the command data does not include the PASID table handle.

In an example, the processor is to convert the PASID value obtained from the PASID table to a second PASID value using a PASID translation structure, and send the command data with the second PASID value to the device.

In an example, the processor further comprises a plurality of configuration registers, each of the plurality of configuration registers to store a PASID value, and the execution circuit is to access the first configuration register of the plurality of registers to obtain the PASID value using the PASID table handle and not access the PASID table.

In another example, a method comprises: receiving, in an execution circuit of a processor, a first instruction having a source operand and a destination operand; obtaining command data from a first location identified in the source operand and extracting a PASID table handle from the command data; accessing a PASID table using a pointer from a first configuration register; indexing into a first entry of the PASID table using the PASID table handle to obtain a PASID value; and inserting the PASID value into the command data and sending the command data to a device coupled to the processor.

In an example, the method further comprises, in response to the first instruction, obtaining the pointer from the first configuration register comprising a PASIDX model specific register, the first instruction comprising a user-level enqueue command X instruction.

In an example, the method further comprises, in response to the first instruction, obtaining the pointer from the first configuration register comprising a PASID model specific register when a multiple address indicator stored in the PASID model specific register is set, the first instruction comprising a user-level enqueue command instruction.

In an example, the method further comprises sending the command data to an enqueue register of the device identified in the destination operand.

In an example, the method further comprises not inserting the PASID value into the command data and raising an exception when a valid indicator of the first entry of the PASID table is reset.

In an example, the method further comprises sending the command data to the device having a different address space than an address space of an agent that issued the first instruction without changing a PASID value associated with the address space of the agent stored in a second configuration register.

In an example, the method further comprises, in response to a reset valid indicator of the first configuration register or a reset valid indicator of the first entry of the PASID table, raising an exception.

In another example, a computer readable medium including instructions is to perform the method of any of the above examples.

In a further example, a computer readable medium including data is to be used by at least one machine to fabricate at least one integrated circuit to perform the method of any one of the above examples.

In a still further example, an apparatus comprises means for performing the method of any one of the above examples.

In yet another example, a system includes a processor, a device and a system memory. The processor may include: a first configuration register to store a pointer to a PASID table; a second configuration register to store a thread identifier associated with a thread of an application; and an execution circuit coupled to the first and second configuration registers, where the execution circuit, in response to a first instruction, is to obtain command data from a first location identified in a source operand of the first instruction, access an entry of the PASID table using the pointer and the thread identifier to obtain a PASID value, insert the PASID value into the command data and send the command data to the device.

The device may include a front end circuit to receive incoming write requests from the processor, the front end circuit comprising a plurality of registers, where in response to a first incoming write request comprising the command data, the front end circuit is to store the command data in a first register of the plurality of registers.

In an example, the execution circuit is to receive the first instruction from the thread of the application, the application having an address space associated with a second PASID value different from the PASID value obtained from the PASID table, while maintaining the second PASID value in another configuration register of the processor.

In an example, the system memory comprises the PASID table, and the execution circuit, in response to the first instruction, is to obtain a PASID table handle from the command data, concatenate the thread identifier and the PASID table handle into a concatenated value and use the concatenated value to index into the entry of the PASID table.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
a first configuration register to store a pointer to a process address space identifier (PASID) table; and
an execution circuit coupled to the first configuration register, wherein the execution circuit, in response to a first instruction, is to obtain command data from a first location identified in a source operand of the first instruction, obtain a PASID table handle from the command data, access a first entry of the PASID table using the pointer from the first configuration register and the PASID table handle to obtain a PASID value, format the command data to include the PASID value, and send the formatted command data to a device coupled to the processor.

2. The processor of claim 1, wherein the execution circuit is to send the formatted command data to a register of the device identified in a destination operand of the first instruction.

3. The processor of claim 1, wherein the device comprises an input/output (I/O) device having a first I/O address space associated with the PASID value, and wherein the execution circuit is to receive the first instruction from a first application having a second address space associated with a second PASID value.

4. The processor of claim 3, wherein responsive to a second instruction from the first application, the execution circuit is to send second command data to a second device coupled to the processor, the second device having a third address space associated with a third PASID value.

5. The processor of claim 1, wherein, if a valid indicator of the first configuration register is not set, the execution circuit is to raise an exception and not access the PASID table.

6. The processor of claim 1, wherein, if a valid indicator of the first entry of the PASID table is not set, the execution circuit is to raise an exception and not send the formatted command data.

7. The processor of claim 1, wherein the first configuration register comprises a PASID model specific register, the PASID model specific register comprising a first field to store a multiple address space indicator which, when set, indicates that the PASID model specific register includes the pointer to the PASID table.

8. The processor of claim 7, wherein when the multiple address space indicator is reset, the PASID model specific register is to store the PASID value, and the execution circuit is not to access the PASID table, and when the multiple address space indicator is reset, the command data does not include the PASID table handle.

9. The processor of claim 1, wherein the processor is to convert the PASID value obtained from the PASID table to a second PASID value using a PASID translation structure, and send the formatted command data with the second PASID value to the device.

10. The processor of claim 1, further comprising a plurality of configuration registers, each of the plurality of configuration registers to store a PASID value, wherein the execution circuit is to access the first configuration register of the plurality of configuration registers to obtain the PASID value using the PASID table handle and not access the PASID table.

11. At least one computer readable storage medium having stored thereon instructions, which if performed by a machine cause the machine to perform a method comprising:
receiving, in an execution circuit of a processor, a first instruction having a source operand and a destination operand;
obtaining command data from a first location identified in the source operand and extracting a process address space identifier (PASID) table handle from the command data;
indexing into a first entry of a PASID table using the PASID table handle to obtain a PASID value; and
inserting the PASID value into the command data and sending the command data having the inserted PASID value to a device coupled to the processor.

12. The at least one computer readable storage medium of claim 11, wherein the method further comprises, in response to the first instruction, obtaining a pointer from a first configuration register comprising a PASIDX model specific register and accessing the PASID table using the pointer from the first configuration register, the first instruction comprising a user-level enqueue command X instruction.

13. The at least one computer readable storage medium of claim 11, wherein the method further comprises, in response to the first instruction, obtaining a pointer from a first configuration register comprising a PASID model specific register when a multiple address indicator stored in the PASID model specific register is set and accessing the PASID table using the pointer from the first configuration register, the first instruction comprising a user-level enqueue command instruction.

14. The at least one computer readable storage medium of claim 11, wherein the method further comprises sending the command data having the inserted PASID value to an enqueue register of the device identified in the destination operand.

15. The at least one computer readable storage medium of claim 11, wherein the method further comprises raising an exception when a valid indicator of the first entry of the PASID table is reset.

16. The at least one computer readable storage medium of claim 11, wherein the method further comprises sending the command data having the inserted PASID value to the device having a different address space than an address space of an agent that issued the first instruction without changing a PASID value associated with the address space of the agent stored in a second configuration register.

17. The at least one computer readable storage medium of claim 12, wherein the method further comprises, in response to a reset valid indicator of the first configuration register or a reset valid indicator of the first entry of the PASID table, raising an exception.

18. A system comprising:
a processor comprising:
a first configuration register to store a pointer to a process address space identifier (PASID) table;
a second configuration register to store a thread identifier associated with a thread of an application; and
an execution circuit coupled to the first and second configuration registers, wherein the execution circuit, in response to a first instruction, is to obtain command data from a first location identified in a source operand of the first instruction, access an entry of the PASID table using the pointer and the thread identifier to obtain a PASID value, insert the PASID value into the command data and send modified command data, the modified command data comprising the command data and the PASID value, to a device;
the device coupled to the processor, wherein the device comprises:
a front end circuit to receive incoming write requests from the processor, the front end circuit comprising a plurality of registers, wherein in response to a first incoming write request comprising the modified command data, the front end circuit is to store the modified command data in a first register of the plurality of registers; and
a system memory coupled to the processor.

19. The system of claim 18, wherein the execution circuit is to receive the first instruction from the thread of the application, the application having an address space associated with a second PASID value different from the PASID value obtained from the PASID table, while the second PASID value is maintained in another configuration register of the processor.

20. The system of claim 18, wherein the system memory is to store the PASID table, and the execution circuit, in response to the first instruction, is to obtain a PASID table handle from the command data, concatenate the thread identifier and the PASID table handle into a concatenated value and use the concatenated value to index into the entry of the PASID table.

* * * * *